Dec. 12, 1950     W. A. J. BACKER     2,533,548
COCKPIT COVER FOR AIRPLANES
Filed May 4, 1948
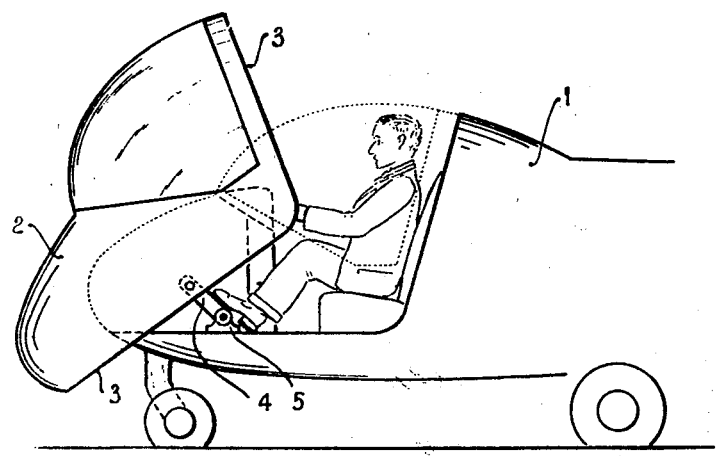
Inventor
WILLEM A. J. BACKER Patented Dec. 12, 1950

2,533,548

UNITED STATES PATENT OFFICE 2,533,548

COCKPIT COVER FOR AIRPLANES

Willem A. J. Backer, Haarlem, Netherlands, assignor to N. V. Nederlandsche Vliegtuigenfabriek Fokker, Amsterdam, Netherlands, a company of the Netherlands Application May 4, 1948, Serial No. 24,983
In the Netherlands May 16, 1947

1 Claim. (Cl. 244—121)

This invention relates to a fuselage for an aeroplane and has for its object to provide the fuselage with such an access-opening that entering and leaving the interior of the fuselage is facilitated.

Particularly with small aeroplanes it is often difficult to get in and get out through the relatively small openings in the fuselage which have to give access to the seats so that in case of emergency when all occupants have to leave the aeroplane in the shortest possible time great danger can arise.

According to the invention said difficulties are removed by forming the upper portion and the side walls of the foremost part of the fuselage as a hood which is adapted to be moved forwards and upwards with respect to the floor portion of said part of the fuselage for uncovering openings enabling to get in and get out laterally. By moving said portion of the fuselage away from the remaining fixed portion such a large access-opening at the seats is uncovered that the interior of the fuselage may now be entered and left without difficulty. Moreover the travelers may get in and get out simultaneously at both sides of the aeroplane. This is particularly of advantage for leaving the aeroplane in case of emergency as quick as possible.

The drawing diagrammatically shows part of a fuselage for an aeroplane according to the invention.

The foremost portion 2 of the fuselage 1 which as a whole is movable is for the rest in its form accommodated to the fixed portion of the fuselage. In the position indicated on the drawing in full lines the portion 2 uncovers at both sides of the fuselage an opening above the floor, which is accommodated to the seated position of the traveller so that said latter can get out the aeroplane in lateral direction simply by turning his legs.

The required movement of the portion 2 of the fuselage may be obtained by a motion of translation or rotation or a combination of both. To this end the part 2 may be moved by linkage means 4 pivotally connecting the cover member and a bracket 5 secured to the fuselage forming part of an actuating mechanism. Preferably a locking device is provided which may be actuated both from the interior of the fuselage and from outside for connecting the movable part 2 to the remaining part of the fuselage to form a rigid unity. The required seal against air and water is obtained by having the movable part 2 at the edges 3 seated on the corresponding edges of the fixed part of the fuselage with sufficient pressure and by providing at these edges a sealing strip, if necessary.

In the case of emergency the joints between both said parts of the fuselage may be released so that the loose part 2 may then be dropped.

The use of the movable part 2 of the fuselage not only facilitates getting in and out the aeroplane but also gives access in a simple manner to the control means, the utensils and other auxiliaries and mechanism, if any, placed in front of the control board and which need continual supervision.

The movable part of the fuselage according to the invention is particularly adapted for smaller aeroplanes in which no sufficient access-openings for getting in and getting out can be obtained in another way. This particularly applies to aeroplanes having seats arranged side by side as the construction according to the invention enables to get in and get out at both sides of the aeroplane.

What I claim is:

In an aircraft fuselage having a nose section, a portion of said section being cut away along substantially vertical and horizontal planes in the general shape of an L to provide a cockpit open at the front, top and sides; a seat in said cockpit above the level of the horizontal plane; a cover member movable between open and closed positions, said cover member having front, top and side sections to fit the space between said planes, said cover member having edges which in its closed position are adjacent said planes, and linkage means pivotally connecting said cover member and said fuselage.

WILLEM A. J. BACKER.

REFERENCES CITED

The following references are of record in the file of this patent:

UNITED STATES PATENTS

| Number | Name | Date |
|---|---|---|
| 2,332,158 | Magill | Oct. 19, 1943 |

FOREIGN PATENTS

| Number | Country | Date |
|---|---|---|
| 495,880 | France | July 15, 1919 |
| 821,868 | France | Sept. 6, 1937 |
| 699,865 | Germany | Dec. 7, 1940 |